US009846720B2

(12) United States Patent
Bhatt et al.

(10) Patent No.: US 9,846,720 B2
(45) Date of Patent: *Dec. 19, 2017

(54) SYSTEM AND METHOD FOR REFINING SEARCH RESULTS

(71) Applicant: International Business Machines Corporation, Armonk, NY (US)

(72) Inventors: Dhruv A. Bhatt, Indian Trail, NC (US); Kristin E. McNeil, Charlotte, NC (US); Nitaben Patel, Charlotte, NC (US)

(73) Assignee: International Business Machines Corporation, Armonk, NY (US)

( * ) Notice: Subject to any disclaimer, the term of this patent is extended or adjusted under 35 U.S.C. 154(b) by 16 days.

This patent is subject to a terminal disclaimer.

(21) Appl. No.: 13/936,416

(22) Filed: Jul. 8, 2013

(65) Prior Publication Data

US 2014/0149393 A1     May 29, 2014

Related U.S. Application Data

(63) Continuation of application No. 13/686,783, filed on Nov. 27, 2012.

(51) Int. Cl.
*G06F 17/30*     (2006.01)

(52) U.S. Cl.
CPC .. *G06F 17/30424* (2013.01); *G06F 17/30867* (2013.01); *G06F 17/30554* (2013.01)

(58) Field of Classification Search
CPC ......... G06F 17/30554; G06F 17/30991; G06F 17/30424; G06F 17/30867

USPC ................................................. 707/722, 723
See application file for complete search history.

(56) References Cited

U.S. PATENT DOCUMENTS

| | | | |
|---|---|---|---|
| 6,249,784 B1 * | 6/2001 | Macke | G06F 17/30646 |
| 6,487,553 B1 * | 11/2002 | Emens | G06F 17/30864 |
| 7,577,644 B2 * | 8/2009 | Fontoura | G06F 17/30867 |
| 7,698,328 B2 * | 4/2010 | Sachs | G06F 17/30648 |
| | | | 707/706 |
| 7,765,220 B2 * | 7/2010 | Bernhardt | G06F 17/30554 |
| | | | 707/603 |
| 7,899,818 B2 | 3/2011 | Stonehocker et al. | |

(Continued)

OTHER PUBLICATIONS

Ming et al.; "Web Search Result Refinement by Document Clustering", ISIC IEEE International Conference on, Oct. 7-10, 2007, pp. 3081-3086.

(Continued)

*Primary Examiner* — Nargis Sultana
(74) *Attorney, Agent, or Firm* — Gates & Cooper LLP

(57) ABSTRACT

A method, apparatus and article of manufacture for refining search results is disclosed. In one embodiment, the method comprises the steps of accepting a search query comprising one or more keywords, generating a first search result comprising one or more first search result members according to the search query, accepting a refinement command identifying one or more undesired first search result members, automatically refining the first search result to exclude the undesired first search result members and first search result members related to the undesired first search result members from the first search result, and providing the automatically refined search result.

7 Claims, 12 Drawing Sheets

(56) References Cited

U.S. PATENT DOCUMENTS

| | | | | |
|---|---|---|---|---|
| 7,917,528 | B1* | 3/2011 | Dave | G06F 17/3064 707/766 |
| 8,135,731 | B2* | 3/2012 | Keohane | G06F 17/30864 707/769 |
| 8,229,948 | B1* | 7/2012 | Ershov | G06F 17/30867 707/765 |
| 8,326,862 | B2 | 12/2012 | Reznik | |
| 2002/0194166 | A1* | 12/2002 | Fowler | G06F 17/30696 |
| 2003/0135725 | A1* | 7/2003 | Schirmer | G06F 17/30648 712/300 |
| 2006/0004716 | A1 | 1/2006 | Hurst-Hiller et al. | |
| 2007/0011154 | A1* | 1/2007 | Musgrove | G06F 17/2785 |
| 2007/0094315 | A1* | 4/2007 | Seo | G06F 17/301 |
| 2007/0239676 | A1* | 10/2007 | Stonehocker | G06F 3/0482 |
| 2008/0172364 | A1* | 7/2008 | Cucerzan | G06F 17/3061 |
| 2009/0144262 | A1* | 6/2009 | White | G06F 17/30389 |
| 2009/0249248 | A1* | 10/2009 | Burckart | G06F 3/0482 715/810 |
| 2009/0265338 | A1* | 10/2009 | Kraft | G06F 17/30864 |
| 2009/0282023 | A1* | 11/2009 | Bennett | G06F 17/30646 |
| 2010/0100540 | A1* | 4/2010 | Davis | G06K 9/0063 707/728 |
| 2010/0114872 | A1* | 5/2010 | Gupta | G06F 17/30648 707/722 |
| 2010/0114873 | A1* | 5/2010 | Gupta | G06F 17/30648 707/722 |
| 2010/0114936 | A1 | 5/2010 | Gupta | |
| 2010/0257479 | A1* | 10/2010 | Do | G06F 9/4446 715/780 |
| 2010/0306242 | A1* | 12/2010 | Chow | G06F 17/30876 707/769 |
| 2011/0047136 | A1* | 2/2011 | Dehn | G06F 17/30864 707/706 |
| 2011/0047507 | A1* | 2/2011 | Urbalejo | G06F 17/30554 715/810 |
| 2011/0231391 | A1* | 9/2011 | Coyne | G06Q 10/06 707/722 |
| 2011/0295827 | A1* | 12/2011 | Genser | G06F 17/30696 707/706 |
| 2011/0307425 | A1 | 12/2011 | Wang et al. | |
| 2011/0313990 | A1* | 12/2011 | Valdes-Perez | G06F 17/30598 707/706 |
| 2011/0320441 | A1* | 12/2011 | Lee | G06F 17/30867 707/723 |
| 2012/0054216 | A1* | 3/2012 | Haahr | G06F 17/30648 707/765 |
| 2012/0066216 | A1* | 3/2012 | Alexander | G06F 17/30887 707/723 |
| 2012/0084283 | A1* | 4/2012 | Chitiveli | G06F 17/30648 707/728 |
| 2012/0095980 | A1* | 4/2012 | Elyada | G06F 17/30864 707/706 |
| 2012/0278316 | A1* | 11/2012 | Reznik | G06F 17/30864 707/723 |
| 2012/0323892 | A1* | 12/2012 | Nakayama | G06F 17/30011 707/722 |

OTHER PUBLICATIONS

Microsoft et al.; "Targeted Search Refinement Tool (TSRT)", ip.com, IPCOM000159154D, Oct. 10, 2007, 6 pages.

Office Action dated Jan. 12, 2015 for U.S. Appl. No. 13/686,783.

* cited by examiner

SYSTEM AND METHOD FOR REFINING SEARCH RESULTS

CROSS-REFERENCE TO RELATED APPLICATION

This application is a continuation of the following co-pending and commonly-assigned patent application:

U.S. Utility patent application Ser. No. 13/686,783, filed on Nov. 27, 2012, by Dhruv Ashokkumar Bhatt, Nitaben Patel, and Kristin Edwards McNeil, entitled "SYSTEM AND METHOD FOR REFINING SEARCH RESULTS,";

which application is incorporated by reference herein.

BACKGROUND OF THE INVENTION

1. Field of the Invention

The present invention relates to systems and methods for performing search queries, and in particular to a system and method for refining search results.

2. Description of the Related Art

One of the benefits afforded by the Internet is the ability to use search engines to locate web pages and other information of interest by use of a search query having one or more keywords entered into a web browser implemented on a client computer. These keywords are sent to a server implementing a search engine which performs the search, and a set of search results is transmitted to the client computer for display to the user. These results are often presented as a plurality of links, each to a web page responsive to the search query and each associated with a uniform resource locator or URL. The user may then select a link to view a web page responsive to the search query.

Unfortunately, when the user enters one or more keywords defining the search query, the search result occasioned by the inclusion of that keyword is often related to different context or concept than was intended by the user. For example, if the user wants to find documents useful in preparing a will, they may enter the keyword "will" as a search query keyword, and execute the search. The search results from this keyword search may present a set of results that includes links to information related to "William Shakespeare," the name of a historical figure. The user may manually scan through the set of search results (including results unrelated to the desired object) to find what they are looking for.

Some query languages permit the user to exclude search results by the use of negative keywords (indicating the user is not interested in searches returning those keywords). For example, the user may perform the keyword query "will-'William Shakespeare'" to indicate that any results including the phrase "William Shakespeare" are to be excluded from the result set. However, that may not exclude results that would include "Sir Shakespeare." As a second example, consider an individual looking for rough diamond jewelry on a commercial website such as AMAZON. The user may receive search results that include jewelry and books about diamonds in the rough. While the user may reformulate the search query and use a negative sign (−) to unwanted keywords from the search result set (e.g. by using the search "rough diamonds−'diamonds in the rough'") that search result will only exclude those results having the phrase "diamonds in the rough," not any result related to "diamonds in the rough." Of course, the user may formulate a more complex phrase to exclude search results related to the unwanted document (e.g. "rough diamonds−(diamonds w/3 rough)"), but this requires that the user understand this query language, and formulate a search in the proper syntax that excludes the unwanted results.

What is needed is a simple, direct, and convenient way to exclude all results related to unwanted search results such as those related to "William Shakespeare," and "diamonds in the rough" in the foregoing examples. The present invention satisfies that need.

SUMMARY OF THE INVENTION

To address the requirements described above, the present invention discloses a method, apparatus and article of manufacture for refining a search result. In an exemplary embodiment, the method comprises the steps of accepting a search query comprising one or more keywords, generating a first search result comprising one or more first search result members according to the search query, accepting a refinement command identifying one or more undesired first search result members, automatically refining the first search result to exclude the undesired first search result members and first search result members related to the undesired first search result members from the first search result, and providing the automatically refined search result. In another exemplary embodiment, the apparatus comprises a server for accepting a search query comprising one or more keywords, and a search engine for generating a first search result comprising one or more first search result members according to the search query. The server also accepts a refinement command identifying one or more undesired first search result members and provides the automatically refined search result, while the search engine also automatically refines the first search result to exclude the undesired first search result members and first search result members related to the undesired first search result members from the first search result.

BRIEF DESCRIPTION OF THE DRAWINGS

Referring now to the drawings in which like reference numbers represent corresponding parts throughout.

DETAILED DESCRIPTION OF PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Hardware Environment

Figure 1:
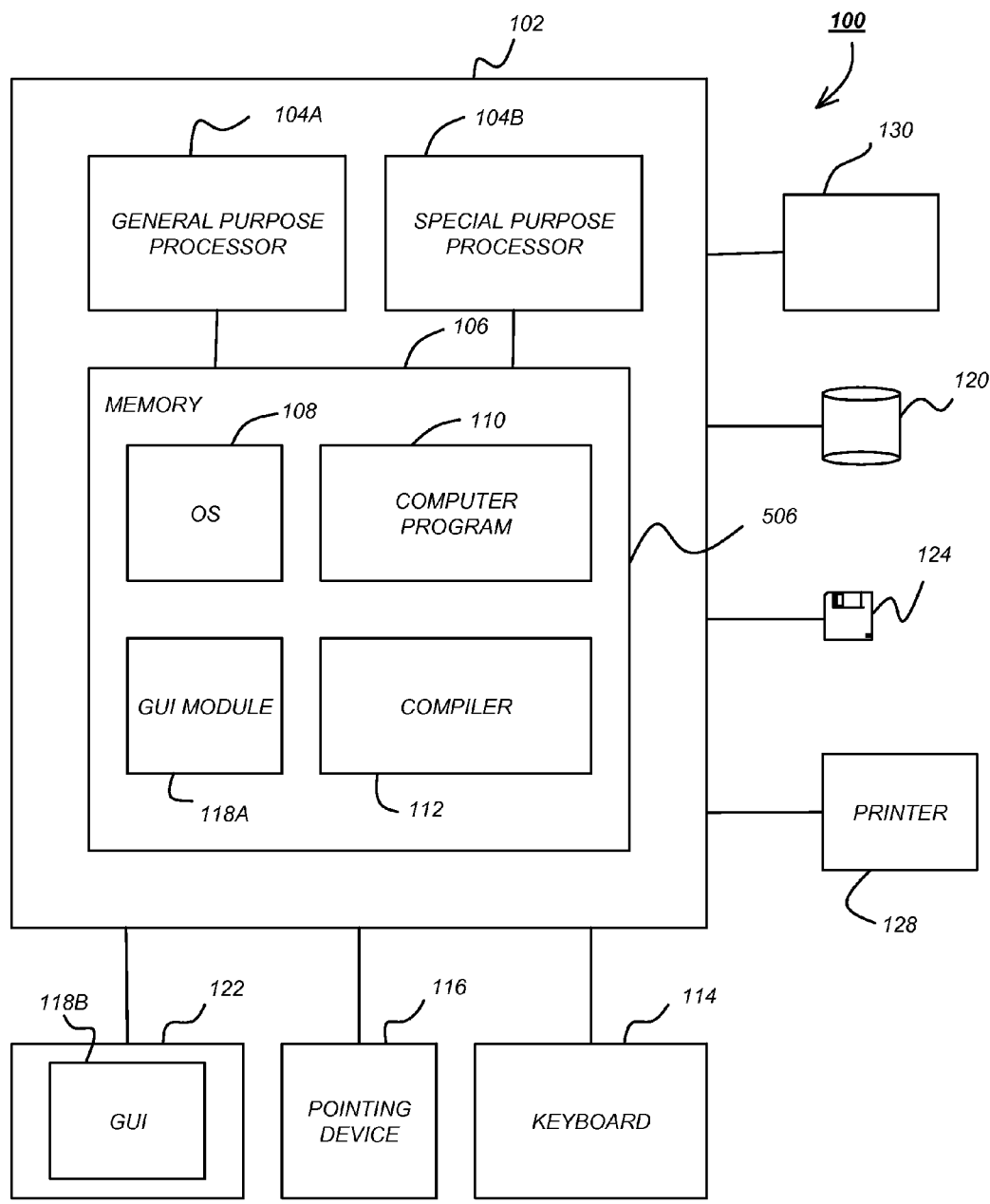
FIG. 1 is a diagram illustrating an exemplary computer system that could be used to implement elements of the present invention.

FIG. 1 is a diagram illustrating an exemplary computer system 100 that could be used to implement elements of the present invention. The computer 102 comprises a general purpose hardware processor 104A and/or a special purpose hardware processor 104B (hereinafter alternatively collectively referred to as processor 104) and a memory 106, such as random access memory (RAM). The computer 102 may be coupled to other devices, including input/output (I/O) devices such as a keyboard 114, a mouse device 116 and a printer 128.

In one embodiment, the computer 102 operates by the general purpose processor 104A performing instructions defined by the computer program 110 under control of an operating system 108. The computer program 110 and/or the operating system 108 may be stored in the memory 106 and may interface with the user and/or other devices to accept input and commands and, based on such input and commands and the instructions defined by the computer program 110 and operating system 108 to provide output and results.

Output/results may be presented on the display 122 or provided to another device for presentation or further processing or action. In one embodiment, the display 122 comprises a liquid crystal display (LCD) having a plurality of separately addressable pixels formed by liquid crystals. Each pixel of the display 122 changes to an opaque or translucent state to form a part of the image on the display in response to the data or information generated by the processor 104 from the application of the instructions of the computer program 110 and/or operating system 108 to the input and commands. Other display 122 types also include picture elements that change state in order to create the image presented on the display 122. The image may be provided through a graphical user interface (GUI) module 118A. Although the GUI module 118A is depicted as a separate module, the instructions performing the GUI functions can be resident or distributed in the operating system 108, the computer program 110, or implemented with special purpose memory and processors.

Some or all of the operations performed by the computer 102 according to the computer program 110 instructions may be implemented in a special purpose processor 104B. In this embodiment, some or all of the computer program 110 instructions may be implemented via firmware instructions stored in a read only memory (ROM), a programmable read only memory (PROM) or flash memory within the special purpose processor 104B or in memory 106. The special purpose processor 104B may also be hardwired through circuit design to perform some or all of the operations to implement the present invention. Further, the special purpose processor 104B may be a hybrid processor, which includes dedicated circuitry for performing a subset of functions, and other circuits for performing more general functions such as responding to computer program instructions. In one embodiment, the special purpose processor is an application specific integrated circuit (ASIC).

The computer 102 may also implement a compiler 112 which allows an application program 110 written in a programming language such as COBOL, C++, FORTRAN, or other language to be translated into processor 104 readable code. After completion, the application or computer program 110 accesses and manipulates data accepted from I/O devices and stored in the memory 106 of the computer 102 using the relationships and logic that was generated using the compiler 112.

The computer 102 also optionally comprises an external communication device such as a modem, satellite link, Ethernet card, or other device for accepting input from and providing output to other computers.

Of course, those skilled in the art will recognize that any combination of the above components, or any number of different components, peripherals, and other devices, may be used with the computer 102.

Although the term "computer" is referred to herein, it is understood that the computer may include portable devices such as cellphones, smartphones, portable MP3 players, video game consoles, notebook computers, pocket computers, or any other device with suitable processing, communication, and input/output capability.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures discussed below illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 2:
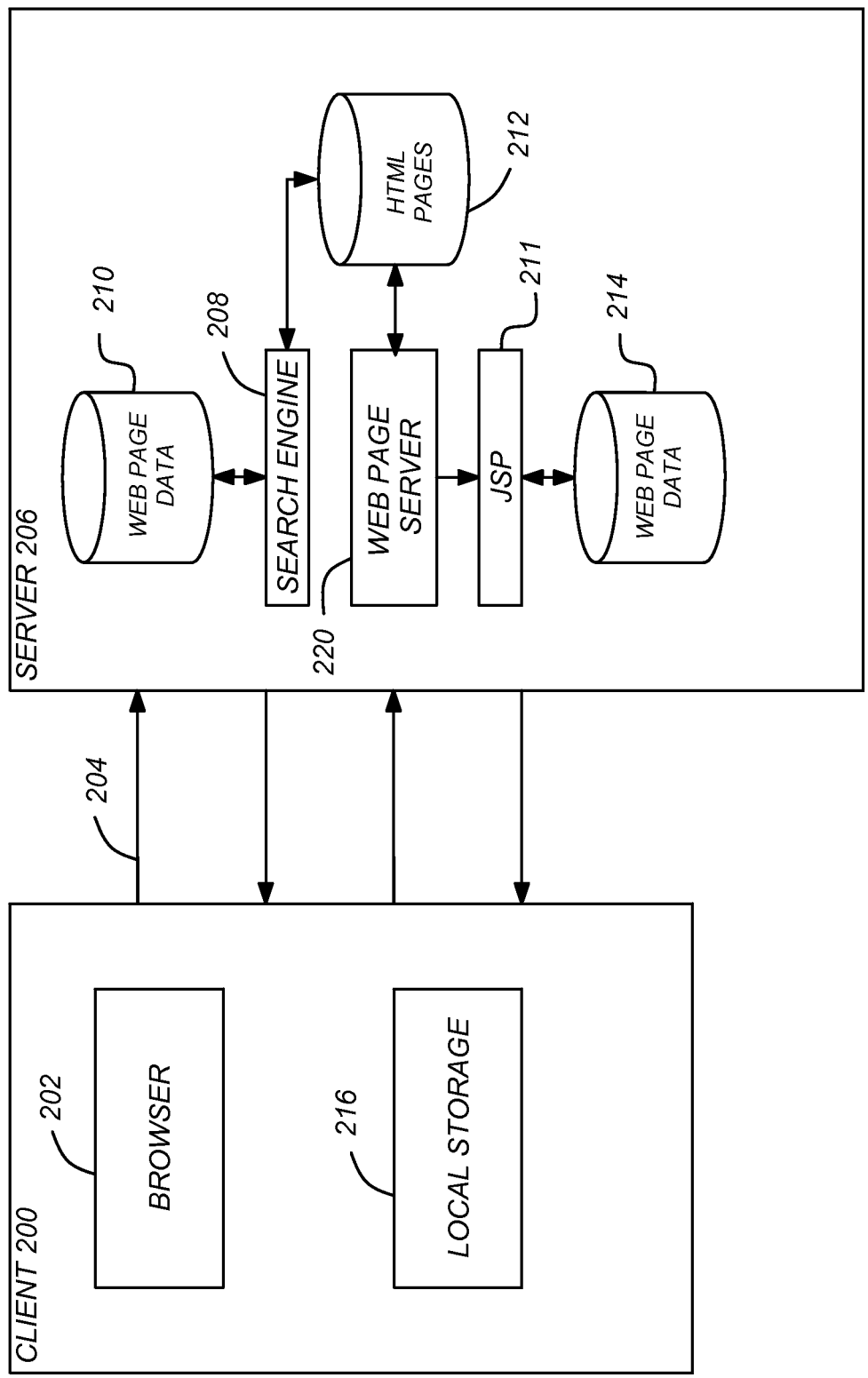
FIG. 2 is a diagram illustrating data flow in refining a Web search in accordance with a preferred embodiment of the present invention.

FIG. 2 is a diagram illustrating data flow in refining a Web search is depicted in accordance with an embodiment of the present invention. In this example, client 200 includes a browser 202, which is employed by a user to generate a search query. The user may enter keywords into browser 202 to generate request 204, which is sent to server 206 for processing by search engine 208. These keywords are search terms used by search engine 208 to identify a set of results. Other types of search terms may be a phrase or sentence entered by a user. In these examples, the communication between client 200 and server 206 occurs using Hypertext Transfer Protocol (HTTP) although other protocols may be used depending on the particular implementation.

Upon receiving request 204, search engine 208 may search for Web pages corresponding to the keywords in request 204. Various well-known mechanisms may be used to determine what Web pages correspond sufficiently to be included in a set of results. For example, a Web page may be identified as a result if all of the keywords are present in the Web page. Alternatively, a Web page may be identified as a result if the keywords occur a certain number of times within the Web page. Additionally, A Web page may be identified as a result if the requested keyword is located in the Web page's following HTML tag: <meta name="keywords" content="requested keyword">. Search engine 208 may search for results in index database 210, which in this example contains identifications of Web pages, which have been indexed for purposes of searching. An index, such as index database 210, contains a searchable catalog of documents created by search engine software. Further, search engine 208 may search HTML pages database 212 for Web pages corresponding to the search results. In these examples, a Web page in the form of HTML page 214 is generated for return to browser 202 in client 200. HTML page 214 contains a set of results, which may be a list of links to Web pages returned in the search performed by search engine 208. HTML page is stored in local storage 216. This Web page is displayed in browser 202 to the user. The user may select a Web page from the results in HTML page 214 to generate request 218. This request is sent to the server identified by the URL in the link.

In this example, this server is the same server that performed the search, server 206. This request is processed by Web page server 220, which may retrieve a Web page from HTML page 214 or dynamically generate a Web page using Java server page (JSP) 222. A JSP is an extension to the Java servlet technology from Sun that provides a simple programming vehicle for displaying dynamic content on a Web page. The JSP is an HTML page with embedded Java source code that is executed in the Web server or application server. The HTML provides the page layout that will be returned to the Web browser, and the Java provides the processing; for example, to deliver a query to the database and fill in the blank fields with the results. In this example, the information used to fill the HTML page is located in Web page data database 224.

After the appropriate Web page is located or generated, HTML page 226 is returned to browser 202. In these examples, browser 202 will parse HTML page 226 for keywords used in the search query sent in request 204. Keywords identified within HTML page 226 are highlighted in the display of the page to the user to allow the user to quickly focus on the section of interest in HTML page 226. These keywords are stored when the search query was initially sent in request 204 to search engine 208.

Figure 3:
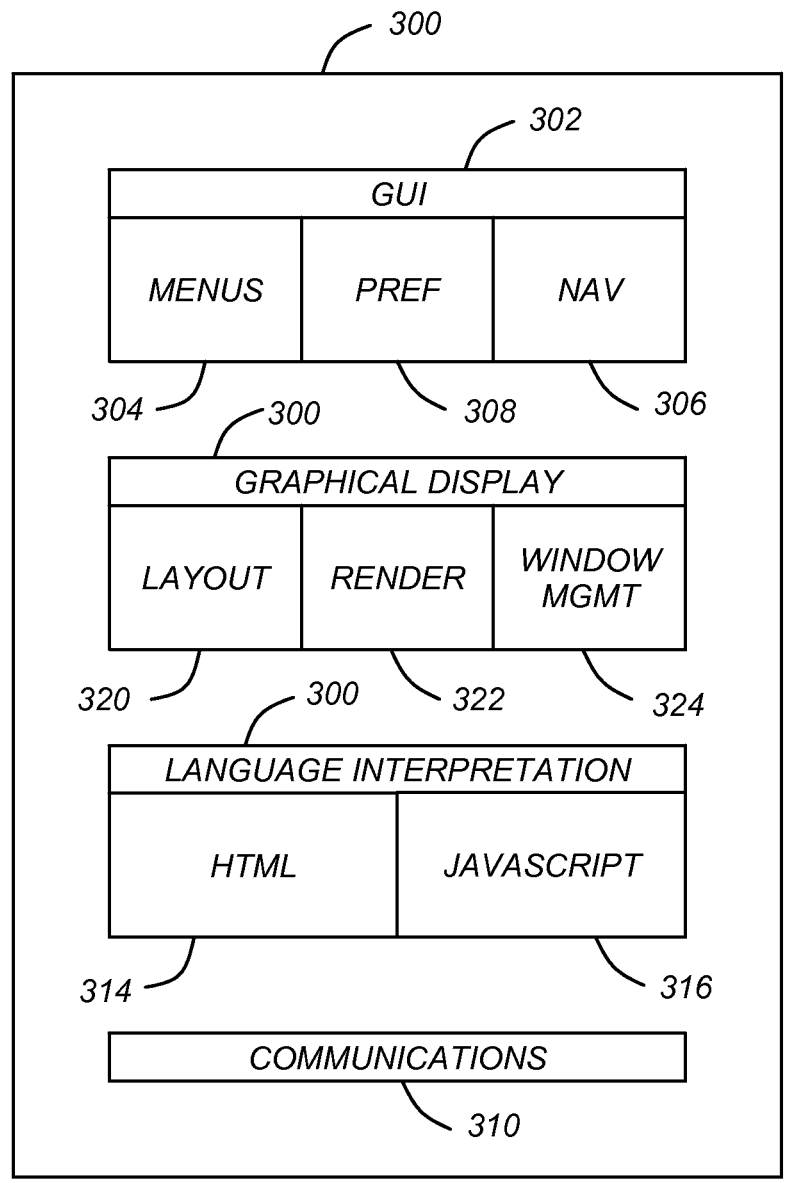
FIG. 3 is a block diagram of a browser program in accordance with an embodiment of the present invention.

FIG. 3 a block diagram of a browser program depicted in accordance with one embodiment of the present invention. A browser is an application used, to navigate or view information or data in a distributed database, such as the Internet or the World Wide Web. Browser 300 is an example of browser 202 in FIG. 2, which is used by a user to search for Web pages.

In this example, browser 300 includes a user interface 302, which is a graphical user interface (GUI) that allows the user to interface or communicate with browser 300. This interface provides for selection of various functions through menus 304 and allows for navigation through navigation 306. For example, menu 304 may allow a user to perform various functions, such as saving a file, opening a new window, displaying a history, and entering a URL. Navigation 306 allows for a user to navigate various pages and to select web sites for viewing. For example, navigation 306 may allow a user to see a previous page or a subsequent page relative to the present page. Preferences such as those illustrated in FIG. 3 may be set through preferences 308.

Communications 310 is the mechanism with which browser 300 receives documents and other resources from a network such as the Internet. Further, communications 310 is used to send or upload documents and resources onto a network. In the depicted example, communication 310 uses HTTP. Other protocols may be used depending on the implementation. Documents that are received by browser 300 are processed by language interpretation 312, which includes an HTML unit 314 and a JavaScript unit 316. Language interpretation 312 will process a document for presentation on graphical display 318. In particular, HTML statements are processed by HTML unit 314 for presentation while JavaScript statements are processed by JavaScript unit 316. In these examples, HTML unit 314 includes the processes of the present invention. These processes are used to parse an HTML page to identify search terms, such as keywords, sentences, or phrases, which were entered by the user to form a search query. When a search term is identified in the HTML page, the search term is highlighted by adding a pair of tags to encompass the search term. In particular, one tag is placed before the search term and the other tag is placed after the search term. These tags are used to highlight or provide an emphasis for the search term when it is displayed by browser 300. These tags are inserted into a copy of the HTML page in a memory at the client, such as local storage 216 in FIG. 2. In this manner, no alteration to the HTML page stored on the server is required. Further, this type of implementation provides an additional advantage because no changes are needed to the many different search engines presently used.

In these examples, although the mechanism of the present invention is implemented in HTML unit 314, these processes may be implemented in other ways. For example, a plug-in or a separate application may be used to process the HTML page. A plug-in is an auxiliary program that works with a software program to enhance its capability.

Graphical display 318 includes layout unit 320, rendering unit 322, and window management 324. These units are involved in presenting web pages to a user based on results from language interpretation 312.

Browser 300 is presented as an example of a browser program in which the present invention may be embodied. Browser 300 is not meant to imply architectural limitations to the present invention. Presently available browsers may include additional functions not shown or may omit functions shown in browser 300. A browser may be any application that is used to search for and display content on a distributed data processing system. Browser 300 may be implemented using known browser applications, such as FIREFOX or MICROSOFT INTERNET EXPLORER. FIREFOX is available from MOZILLA while MICROSOFT INTERNET EXPLORER is available from MICROSOFT CORPORATION.

Figure 4:
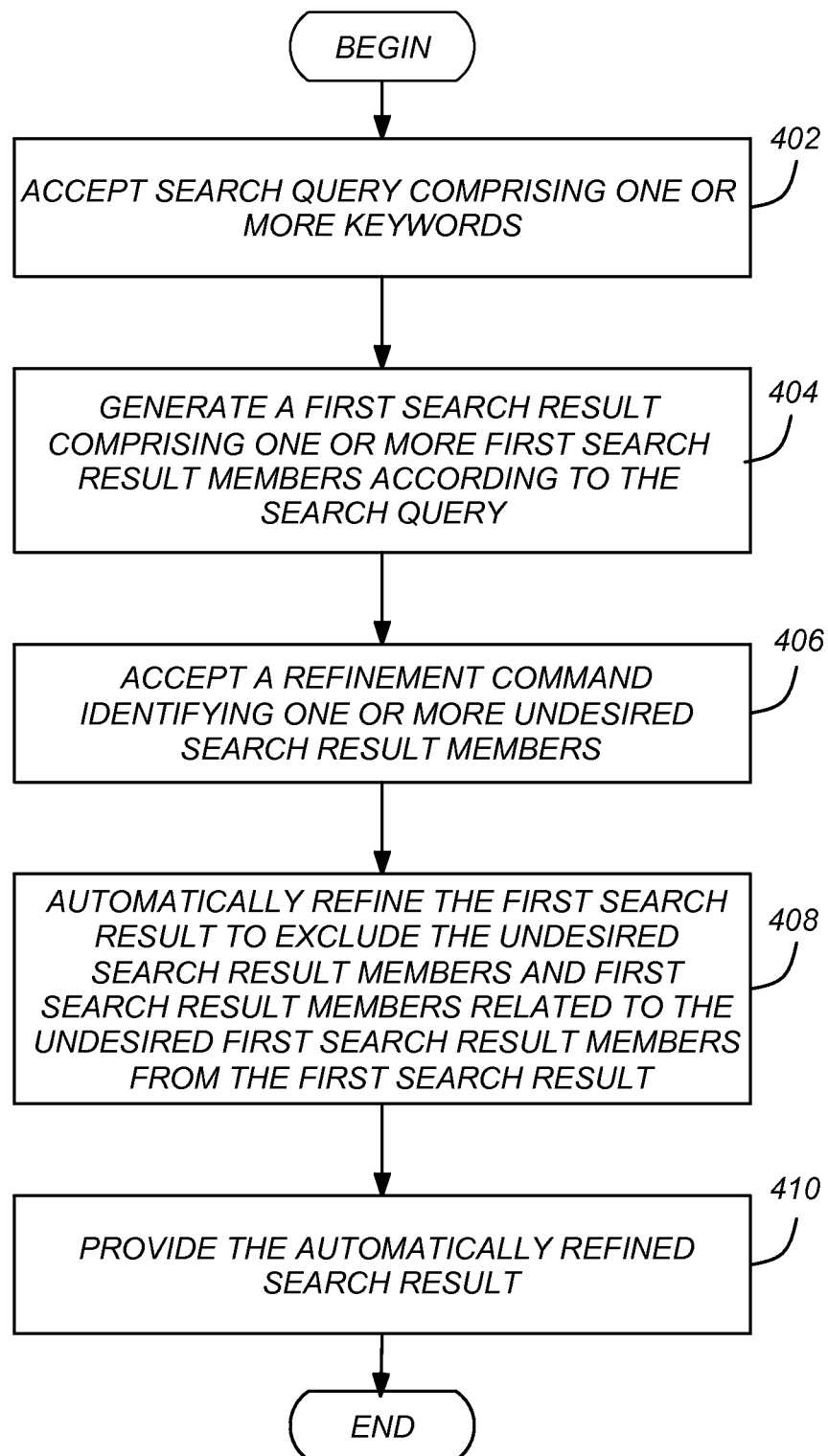
FIG. 4 is a diagram illustrating exemplary process steps that can be used to practice one embodiment.

FIG. 4 is a diagram illustrating exemplary process steps that can be used to practice one embodiment. In block 402, a search query or request is accepted. The search query can include one or more keywords.

Figure 5:
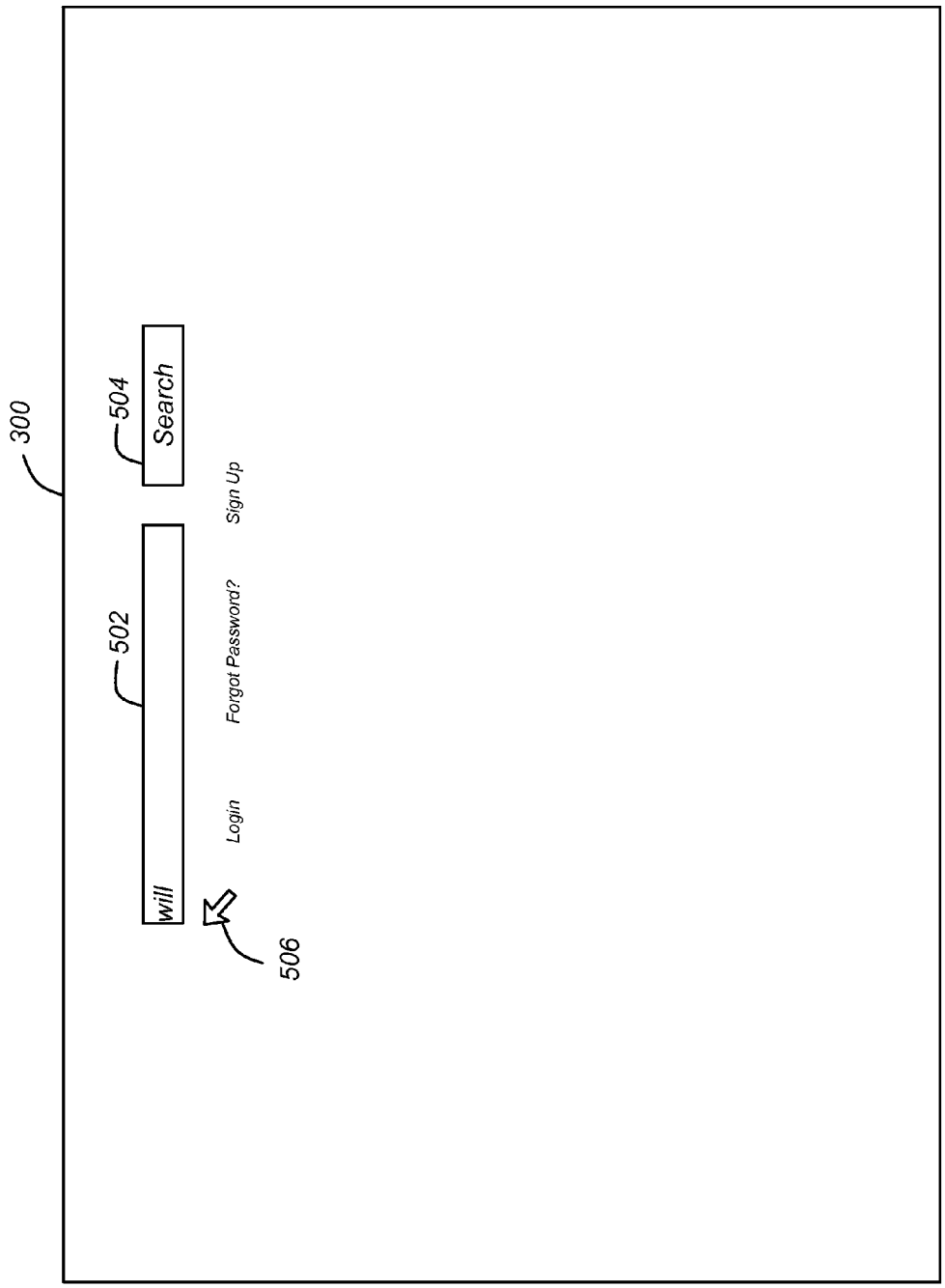
FIG. 5 is a diagram illustrating one embodiment of a browser window presenting an input field for a search query.

FIG. 5 is a diagram illustrating one embodiment of a browser 300 window presenting an input field 502 for the search query. In this embodiment, the user moves a cursor 506 within the input field, and types the keywords in the input field 502, using the required query language and protocols. Although many search engines support a search query functionality using boolean operators (AND, OR, NOT) and relational operators such as (NEAR or W/5), a typical user performing a web search will simply enter one or more keywords and the search engine will assume boolean and relational operators that apply to the keywords.

Returning to FIG. 4, the search engine generates a first search result set comprising one or more search result members according to the search query.

Figure 6:
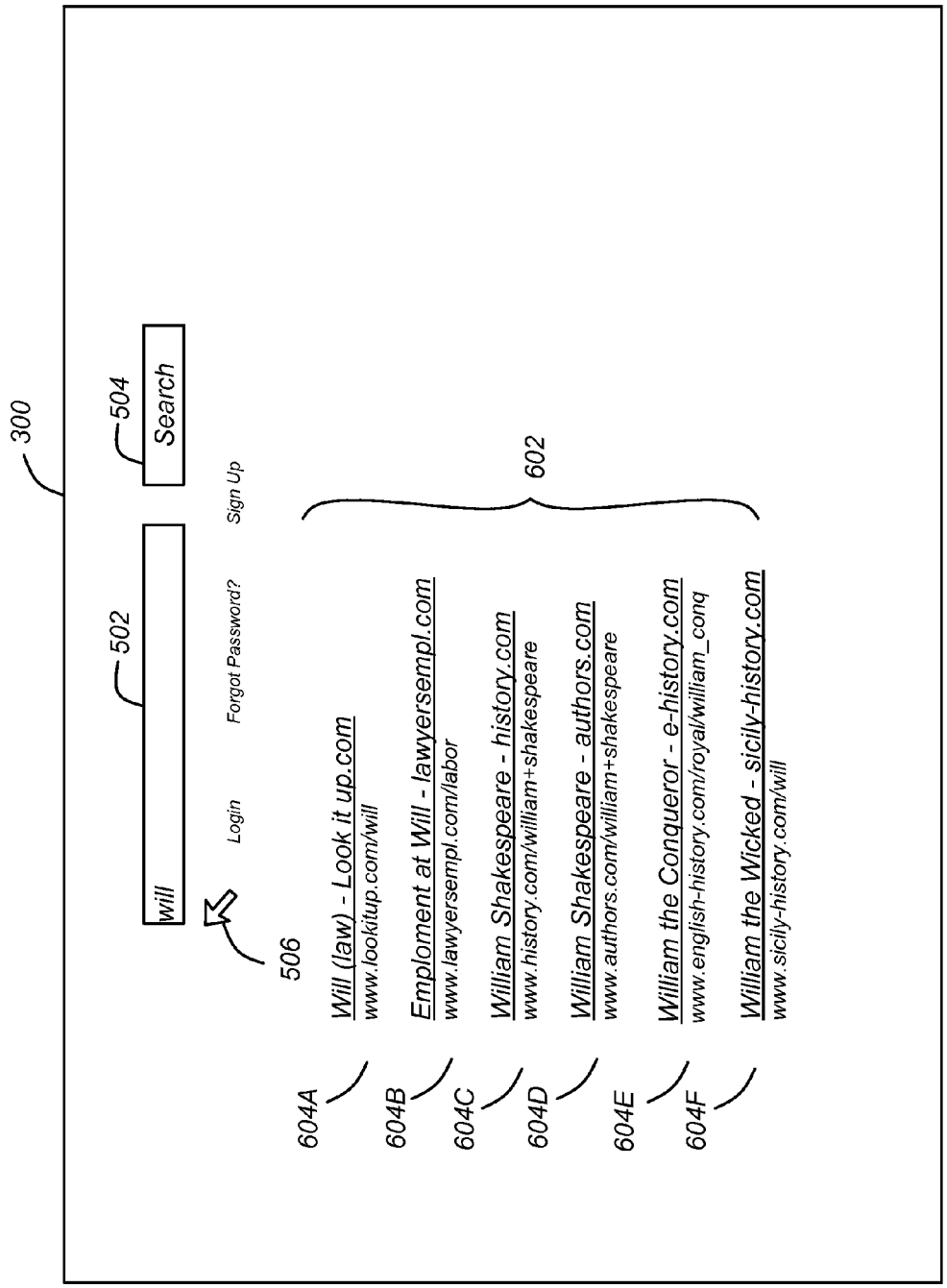
FIG. 6 is a diagram illustrating a representative first set of search results.

FIG. 6 is a diagram illustrating a representative first set 602 of search results for one of the examples previously discussed wherein the user enters the keyword "will." The set 602 includes individual search results 604A-604F. Each result (hereinafter alternatively referred to as first result 604) typically includes a hotlink to the uniform resource locator (URL) related to the associated search result, so if that text is selected using the cursor 506, the browser 300 is directed to the associated URL.

The search query with the keyword "will" has resulted in a search result set 602 including results related to a testamentary will (604A), which is a legal concept, employment at will (604B), another legal concept unrelated to a testamentary will, William Shakespeare (604C and 604D), a literary figure, Prince William (604E) a royal celebrity, and William the Wicked (604F), another historical figure.

Considering the case where the user is interested only in search results related to a testamentary will, the user could perform another search by typing the keywords "testamentary will" in the input field 502, and selecting the search control 504. However, this relies on the user recognizing that the word "testamentary" is a useful way to characterize the search results the user is interested in (unlikely if the user is not trained in law). In addition, this search result may omit results that the user is interested in, as results without the keyword "testamentary" would not be included. Instead, the present invention allows the user to easily eliminate uninteresting members of the query result set 602, and optionally, any members of the query result set 602 related to the uninteresting result member.

Returning to FIG. 4, a refinement command that identifies one or more undesired search result members is accepted, as shown in block 406.

Figure 7:
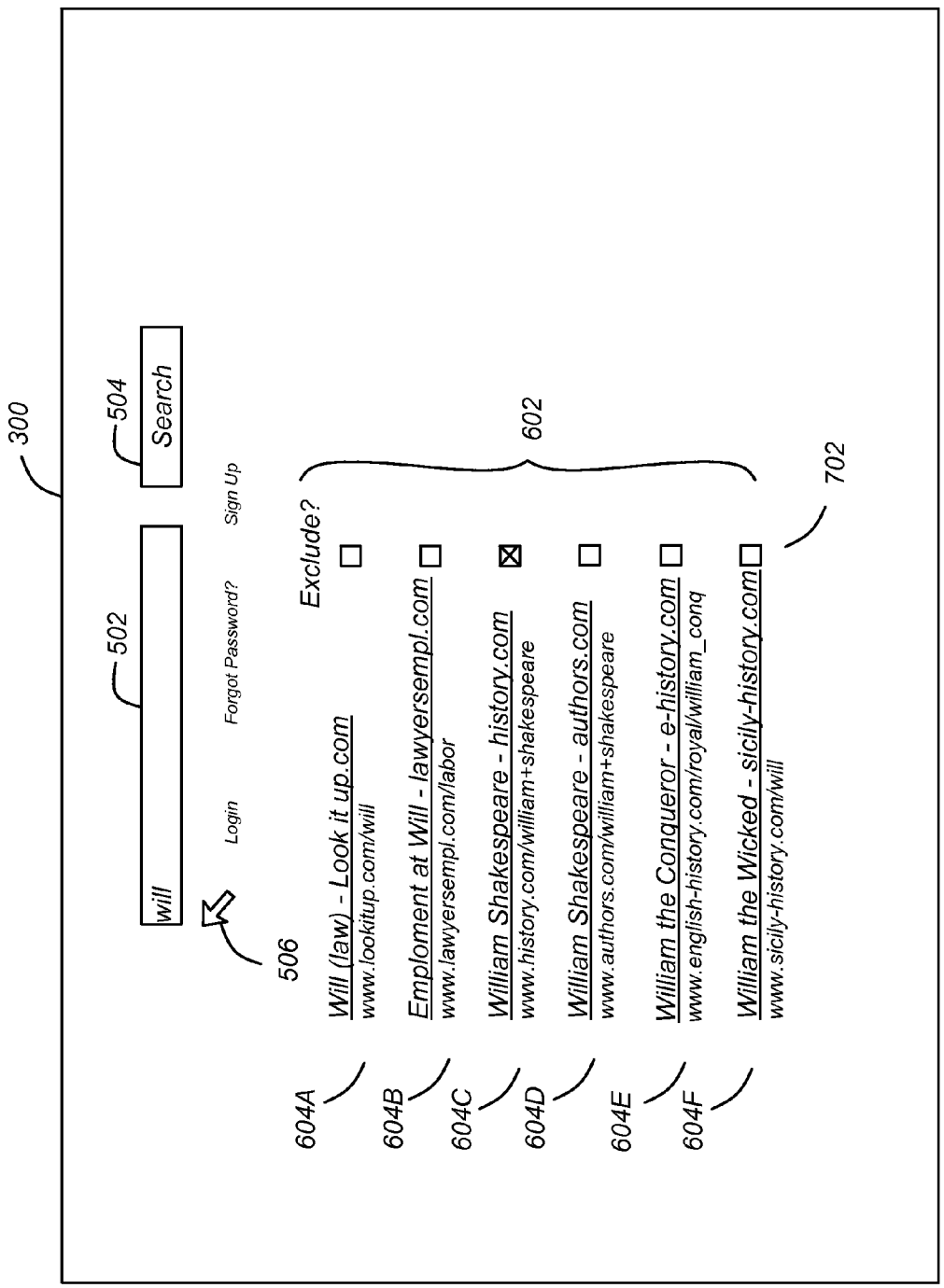
FIG. 7 shows one embodiment of how undesired query result set members can be selected and how results that are related or contextually related to the selected item can be identified.

FIG. 7 shows one embodiment of how undesired query result set members can be identified. In this embodiment, the undesired query result set members are identified by selecting the input box 702 adjacent or proximate the search result set member 602. In the illustrated embodiment, the box 702 associated with the "William Shakespeare" results from historical.com have been selected. Following this selection, the search query can be refined by again selecting the "search" control 504.

Returning to FIG. 4, the search result set is automatically (e.g. without further user input) refined to exclude the undesired first search result members and first search result members related to the undesired first search result members, as shown in block 408.

Search results can be refined to exclude one or more categories of search results. For example, the search results can be refined to exclude any results that include "William Shakespeare" or any results that are related to the author. That this or any particular document or result is related to or used in the context William Shakespeare, a person, author, and historical figure, can be identified using text analytics on the document or the metadata associated with the document.

In one embodiment, results that are related to or used in context with the selected item (in the foregoing example, "William Shakespeare") is determined by using text analytics such as those defined in the Unstructured Information Management Architecture (UIMA), or like technology. UIMA is a component software architecture for the development, discovery, composition and deployment of multimodal analytics for the analysis of unstructured information and it's integration with search technologies. A more detailed reference of UIMA can be obtained from the APACHE SOFTWARE FOUNDATION at http://uima.apache.org/uima-specification.html.

Using this technique, the search results are annotated for context using rules and dictionaries that are typically generated before the result. After the user selects the uninteresting search result(s), a refined search results are found with a similar context to that of the uninteresting result(s), and these refined search results (which do not include any results in the same context as the excluded result) are then provided to the user.

For example, the following dictionaries may exist before the search result is received:
(1) a "GIVEN NAME" dictionary;
(2) a "FAMILY NAME" dictionary;
(3) an "AUTHORS" dictionary; and
(4) "WILLIAM SHAKESPEARE BOOKS."

The content of these dictionaries may be as follows:

Given Name Dictionary

TABLE I

| |
|---|
| Agatha |
| Barbara |
| Danielle |
| Harold |
| John |
| Jeremy |
| Robert |
| Gates |

TABLE I-continued

| |
|---|
| William |
| Bill |

Family Name Dictionary

TABLE II

| |
|---|
| Howard |
| Cartland |
| Steel |
| Smith |
| Tolstoy |
| Roberts |
| Gates |
| King |
| Shakespeare |
| Johnson |

Authors Dictionary

TABLE III

| |
|---|
| Agatha Christie |
| Barbara Cartland |
| Danielle Steel |
| Harold Robbins |
| J. K. Rowling |
| Leo Tolstoy |
| Nora Roberts |
| Robert Ludlum |
| Stephen King |
| William Shakespeare |

William Shakespeare Books Dictionary

TABLE IV

| |
|---|
| All's Well That Ends Well |
| As You Like It |
| The Comedy of Errors |
| Love's Labour's Lost |
| Measure for Measure |
| The Merchant of Venice |
| The Merry Wives of Windsor |
| A Midsummer Night's Dream |
| Coriolanus |

Each of the document, files, or other database information may be tokenized such that each word or element in the document is identified as a token. Such files may include, for example, a word processing document file, a presentation file, or HTML. These files may be tokenized by identifying the words contained therein with a token.

The results of the initial search (for example, as shown in FIG. 6) can then be parsed through to identify each word in the initial search result matching the search term (in our example, "will") may be annotated to identify it's context or category of speech (e.g. whether it is a noun, adjective, verb, adverb or other category of speech). Further annotations (for example, whether a noun is a person, place, or a thing) may also be performed. At least one instance of that search term in the search result is then annotated. For example, referring again to the case wherein the search term is "will," each instance of "will" in the results is annotated as a "noun" or a "person."

This may be accomplished using text analytics in which the document is parsed through the document and compared to a dictionary according to a parsing rule. For example, a simple parsing rule can be identified wherein one or more search terms are identified as a "person" when a word in the document is a member of the "GIVENNAME" directory and another word adjacent or nearby is a member of "FAMILY NAME" directory. Under this definition, parsing rules can be identified to categorize the "will" entry as a "person" if it is proximate the word "Shakespeare." Other parsing rules for identifying a word as referring to a person may be GIVENNAME Followedby FAMILYNAME
GIVENNAME, FAMILYNAME MiddleInitial
GIVENNAME MiddleInitial FAMILYNAME Therefore, using GIVENNAME and FAMILYNAME dictionaries and parsing rules text analytics can identify that Will (Givenname) Shakespeare (Familyname) is a "person" and using the Author dictionary it will identify that this person is an author. Using a similar rule that identifies an entry as related to a legal document if the term "will" is proximate to the term "testament."

The search results obtained in response to the initial search report is annotated with a value so that each instance of the search term ("will" in the foregoing example) is categorized, for example, as a "person" or as a "legal document" or both (for example, if the document contained information on William Shakespeare and a legal will).

When the user selects results to exclude William Shakespeare (for example, as shown in FIG. 7), automatically refined search results are then provided, as shown in block 410. In an embodiment search results are refined to exclude results related to an uninteresting general category. For example, in the foregoing example, search results related to authors figures can be excluded. Or, search results may be refined to exclude results related to an uninteresting subject, such as William Shakespeare. In another embodiment, a plurality of uninteresting or undesired search results in the search results set can be selected, and those selections used to determine the scope of the uninteresting result set. For example, if the user were to select items 604C-604F, it may be inferred that the user is not interested in topics related to historical figures, but interested in topics related to legal subject matter. Further, if 604B is selected as undesired, the search engine 208 can reasonably infer that the user is interested in legal topics, but only those related to testamentary matters, not employment.

Figure 8B:
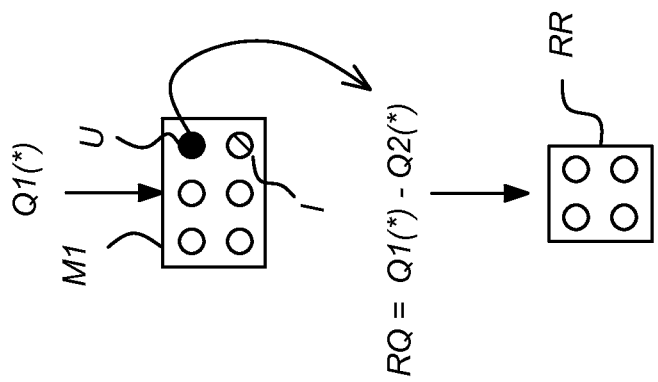
FIGS. 8A and 8B are diagrams illustrating two techniques for automatically generating the refined search result.
Figure 8A:
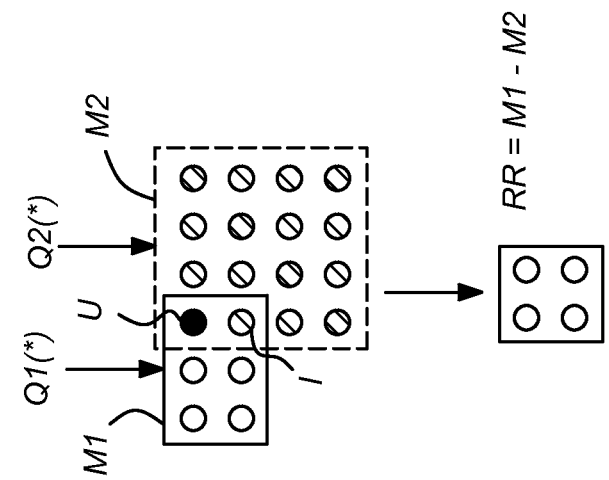

FIGS. 8A and 8B are diagrams illustrating two techniques for automatically generating the refined search result.

In the technique illustrated in FIG. 8A, a query (Q1(*)) is executed, resulting in a first result set (M1) having first result set members. User input identifying undesired first result set members (U) is accepted, and a second search (Q2(*)) is executed based on the identified undesired search results (U). This results in a second search result set (M2). First result set members M1 that are also in the second result set M2 are then excluded to form the refined search result (RR). Hence, the refined search result RR has the first result set members M1 but excludes any of the first result set members that are also members of the second result set M2. Note that first result set member I was not identified by the user as undesirable, but nonetheless, is a member of the second search set (it resulted from the search query Q2 because it was related to the undesirable result member U), and is therefore excluded from the refined result set.

In the technique illustrated in FIG. 8B, the undesired result member U is used to define a second query Q2(*), but instead of removing the results of the second query from the results of the first query as shown in FIG. 8A, the second query modifies the first query to generate refined query RQ that is executed to produce a refined result (RR). Particular examples of both techniques are described below.

Figure 9:
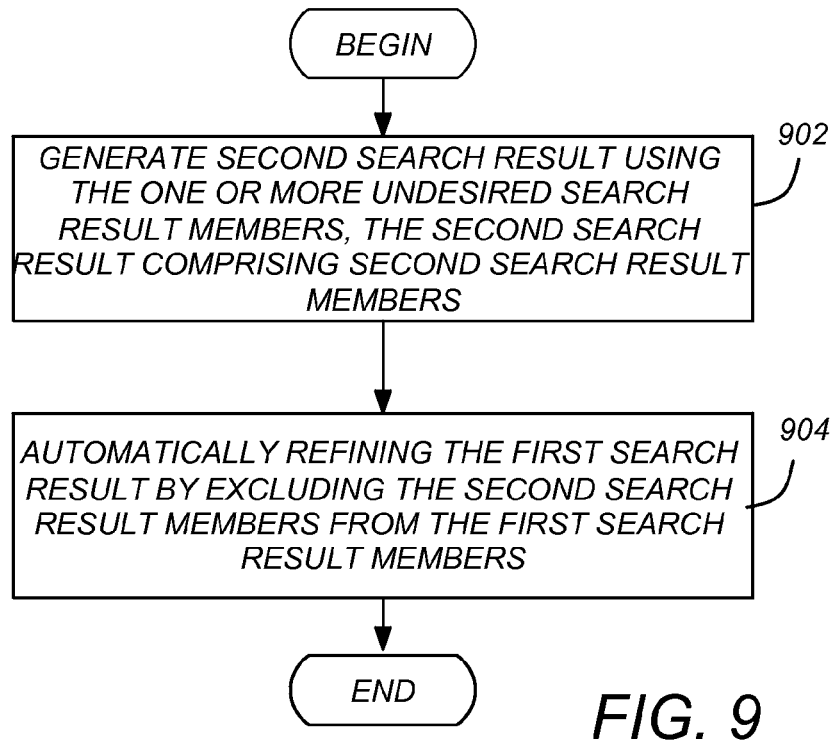
FIG. 9 is a diagram illustrating one technique for automatically generating a refined search result.

FIG. 9 is a diagram illustrating one technique for automatically generating a refined search result. This technique is analogous to that which is illustrated in FIG. 8A. In block 902, a second search result having second search result members is generated from the one or more undesired search result members. For example, if the user designated undesired search results as indicated in FIG. 7 (selecting result 604C), a second search result set could be generated for "William Shakespeare" and those second search result set members could be excluded from the first result set. In block 904, the first search result is automatically refined by excluding the second search result members.

Figure 10:
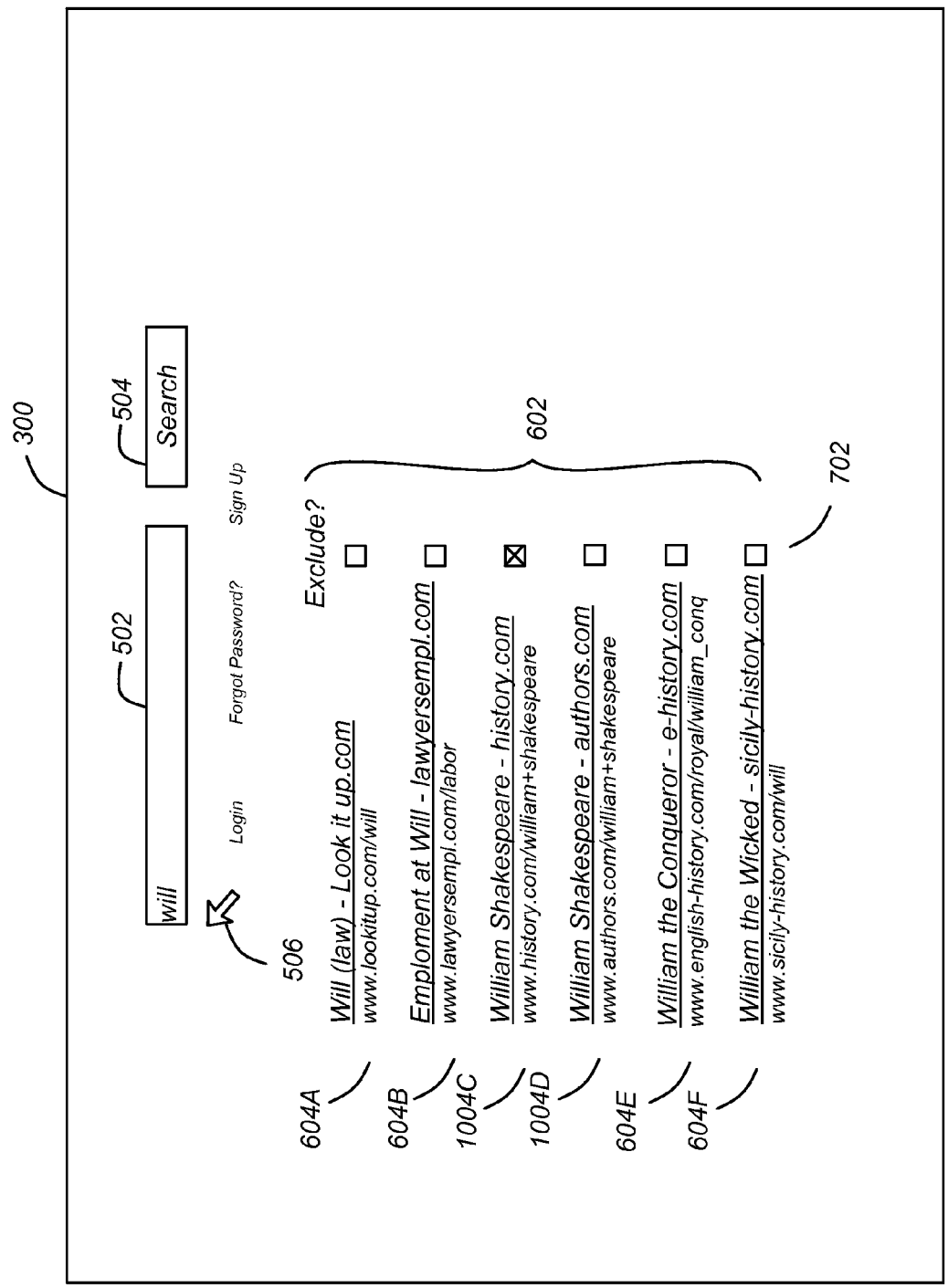
FIG. 10 is a diagram illustrating a result of a search query.

For example, referring back to FIG. 6, the first result set member 604D (William Shakespeare—authors.com) would likely be a member of the second result set, and would be removed from the first result set, thus leaving no result including "William Shakespeare". The user can then be provided with the result shown in FIG. 10, in which first result set members 604C and 604D were removed from the first result set and replaced with other of the members 1004C and 1004D of the first result set. The user can then delimit other search results for exclusion using the same technique.

Alternatively, the user may delineate first result set members 604C, 604D, 604E and 604F for exclusion. In which case, the second search result members will include results for all of the listed celebrities, and their search results will be excluded. Or, the second search result could infer from the fact that all of the undesired results are historical figures and conclude that the user is uninterested in search results about historical figures, and exclude results about celebrities from the first result set.

Figure 11:
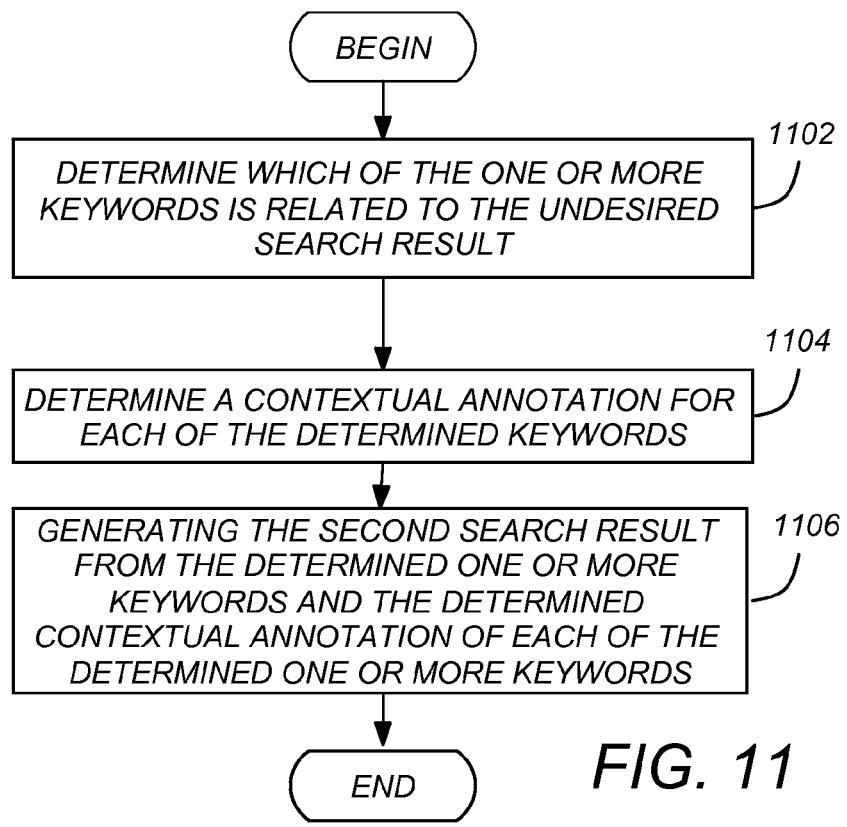
FIG. 11 is a diagram illustrating a technique for generating the second search result described in FIGS. 8A and 9.

FIG. 11 is a diagram illustrating a technique for generating the second search result described in FIGS. 8A and 9. In block 1102, a determination is made regarding which of the one or more keywords is related to the undesired search result. For example, in the simple case of a single keyword ("Will"), the undesired results are related to that keyword. One or more annotations are then determined for each of the determined key words, as shown in block 1104, using the techniques described above. Such annotations provide contextual information regarding the keyword and may belong to a variety of annotation types.

For example, the keyword "Will," may refer to a legal instrument or a person, depending on the context of how it is used in the document. Annotation types may include lexical classes such as a nouns, verbs, adjectives and/or adverbs. Types and subtypes of annotations may also be defined. For example, the <noun> lexical class can include annotation types or subtypes of <person>, <place> and <thing> and the <person> annotation type or subtype may include subcategories <last name>, <first name>. Annotation types may be determined without regard to lexical class (for example, <celebrities>, <locations> annotation types and the like), and the defined annotation types may differ based upon the keyword. For example, the search engine may recognize that the keyword "Will" can be separated into <names> or <law> categories.

Once the contextual annotation of the undesired search result members have been determined, a second search result is generated from the determined one or more keywords and the determined contextual annotation of each of the determined one or more keywords, as shown in block 1106. Hence, only those keywords associated with the annotation are included in the second search result M2, as shown in block 1106. The practical result is that the second search result M2 will include results from keywords contextually related to the undesired initial search results. For example, if the initial key word of "Will" produced results in that included William Shakespeare and legal wills and results related to William Shakespeare were designated to be uninteresting, the second search result could be obtained by performing a keyword search such as "Will+Shakespeare" providing results relevant to William Shakespeare. In this embodiment, the refined result is determined by subtracting from the first result set M1 any members that are in the second result set M2, and hence, the refined result set will exclude undesired U first result set members as well as result set members I that are related to the undesired U first result set members.

Figure 12:
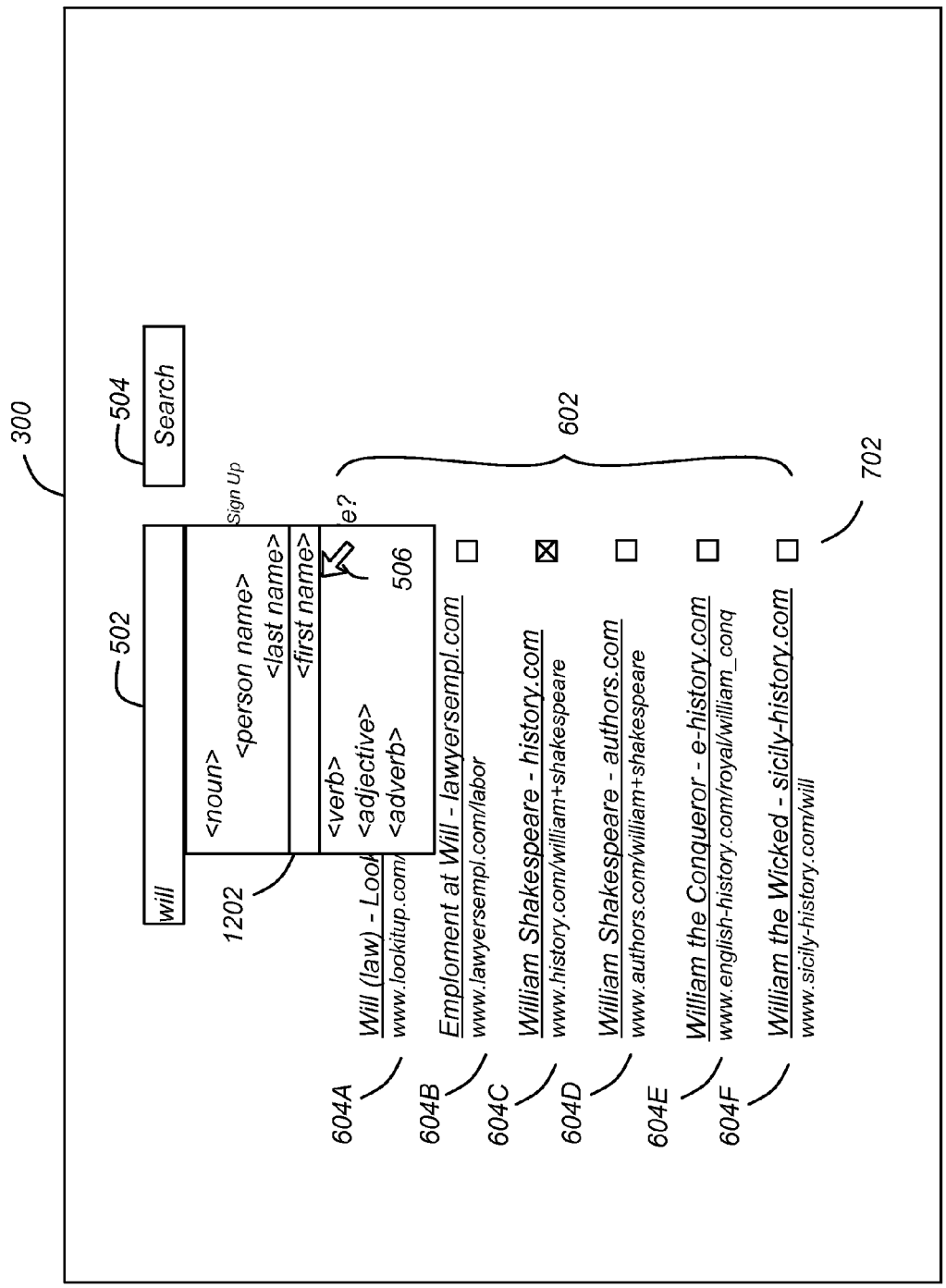
FIG. 12 is a diagram showing the determination of an annotation of a keyword via user input.

The determination of the appropriate annotation type can be made based upon which members of the first result set 602 the user selects for exclusion (for example, selection of member 604C in FIG. 6) or by direct user selection using downbox 1202 as shown in FIG. 12. For example, if the user selected item 604C for exclusion, the search engine may infer the appropriate annotation from that selection. For example, since William Shakespeare is a member of the <noun>, <person> lexical class/annotation type, the determined annotation type and lexical class for the keyword "Will" may be <noun>, <person>.

Figure 13:
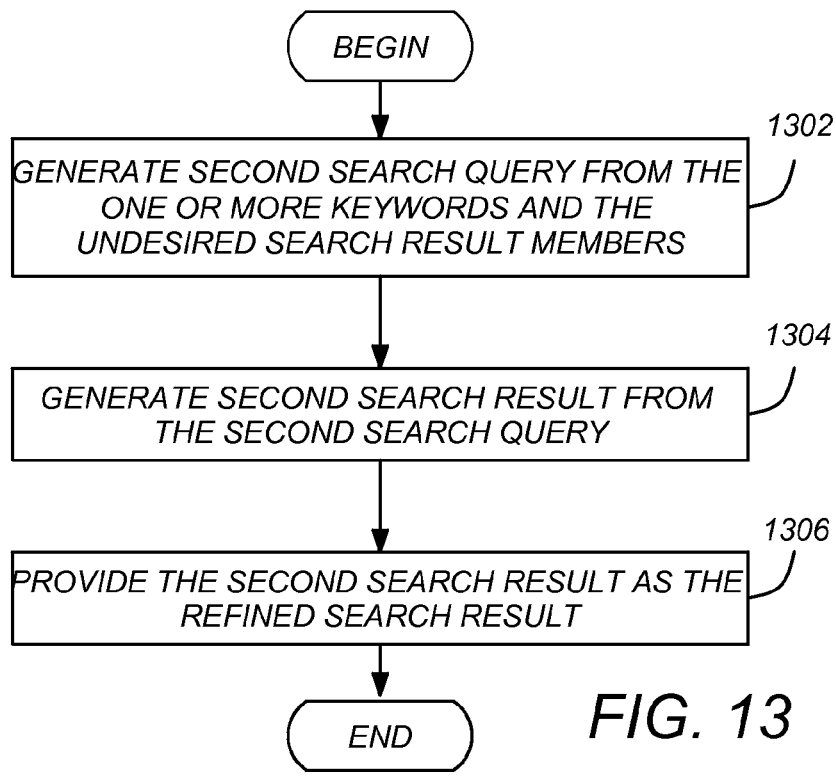
FIG. 13 is a diagram illustrating one technique for automatically generating a refined search result.

FIG. 13 is a diagram illustrating another technique for automatically generating a refined search result. This technique is analogous to that which is illustrated in FIG. 8B. In this technique, a second search query Q2(*) is automatically generated from the one or more keywords in the first search query Q1(*) and the undesired search result members U, as shown in block 1302. In block 1304, a second search result is generated using the second search query Q2(*). For example, the first search query Q1(*) may be modified by the second search query Q2(*) to produce a refined query RQ=Q1(*)–Q2(*) that is used to generate a second search result, and the second search result can be provided as the refined search result, as shown in block 1306.

Figure 14:
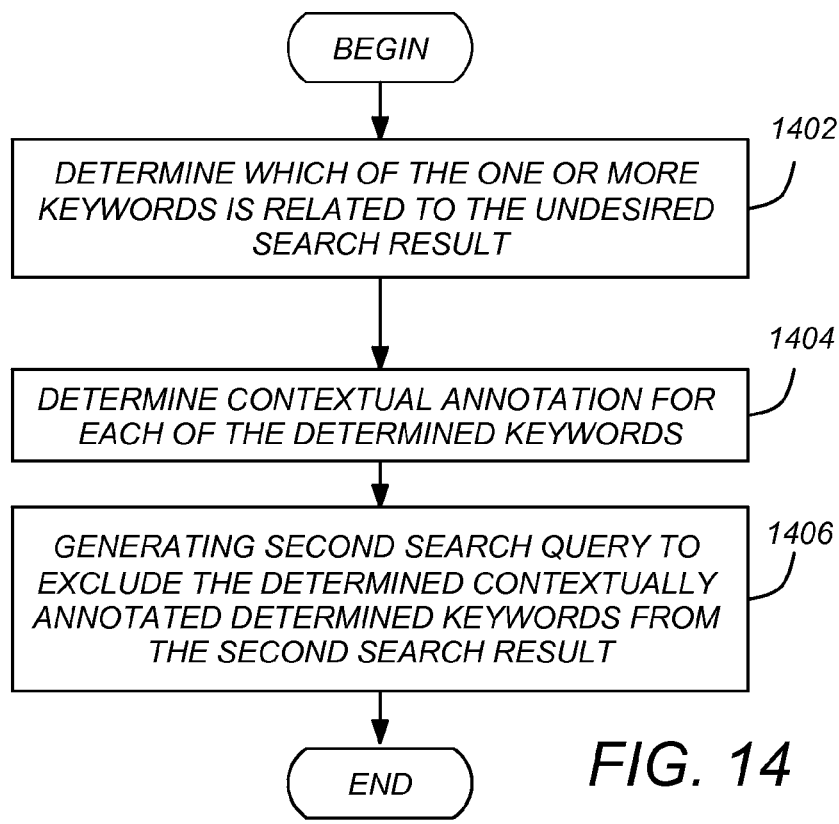
FIG. 14 is a diagram illustrating how the second search result can be generated from the second query.

FIG. 14 is a diagram illustrating how the second search result Q2(*) can be generated from the second query. In block 1402, a determination is made as to which of the one or more keywords of the first query is related to the undesired search result. In block 1404, the contextual annotation is determined for each of the determined key words. In block 1406, a second search query is generated that will exclude the determined contextually annotated determined keywords from the second search result.

For example, returning to the previous example illustrated in FIG. 7, a second search query Q1(*)-Q2(*) (for example, "Will (—"William Shakespeare")) can be performed to generate the second search query that will generate a second search result that will exclude William Shakespeare.

CONCLUSION

This concludes the description of the preferred embodiments of the present invention. The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A computer-implemented method of refining a search result, comprising:
   accepting a first search query comprising one or more keywords;
   generating a first search result comprising one or more first search result members according to the first search query;
   accepting a refinement command from a user selecting one or more undesired first search result members;
   determining a scope for the selected one or more undesired first search result members;
   generating a second search result from the determined scope, the second search result comprising second search result members inferred from the determined scope, and further wherein generating the second search result comprises:
      determining which of the one or more keywords in the first search query is related to the selected undesired first search result members;
      determining a contextual annotation for each of the determined one or more keywords in the first search query; and
      generating the second search result from the determined one or more keywords and the determined contextual annotation of each of the determined one or more keywords;
   automatically refining the first search result using the second search result, wherein the refining comprises subtracting the second search result from the first search result; and
   providing the automatically refined search result.

2. The method of claim 1, wherein the refinement command is a delimiter proximate the undesired first search result member.

3. The method of claim 1, wherein the step of automatically refining the first search result comprises excluding the second search result members from the first search result members.

4. The method of claim 1, wherein:
   the contextual annotation comprises a lexical class.

5. The method of claim 1, wherein:
   the step of automatically refining the first search result comprises the steps of:
   generating a second search query from the one or more keywords and the one or more undesired first search result members; and
   modifying the first search query with the second search query to generate the refined first search result.

6. The method of claim 5, wherein the step of generating a second search query from the one or more keywords and the undesired first search result members comprises the steps of:
   determining which of the one or more keywords is related to the undesired first search result members;
   determining a contextual annotation for each of the determined one or more keywords; and
   generating the second search query to exclude the determined contextually annotated determined keywords from the second search result.

7. The method of claim 6, wherein:
   the contextual annotation comprises a lexical class.

* * * * *